No. 777,178. PATENTED DEC. 13, 1904.
E. BOLEY.
APPARATUS FOR REMOVING SCALE FROM METAL RODS.
APPLICATION FILED FEB. 12, 1903.
NO MODEL. 4 SHEETS—SHEET 1.

No. 777,178. PATENTED DEC. 13, 1904.
E. BOLEY.
APPARATUS FOR REMOVING SCALE FROM METAL RODS.
APPLICATION FILED FEB. 12, 1903.
NO MODEL. 4 SHEETS—SHEET 3.

Witnesses.
L. L. Davis
G. W. Saywell

Inventor
Ernst Boley
by J. D. Fay
Attorney

No. 777,178. PATENTED DEC. 13, 1904.
E. BOLEY.
APPARATUS FOR REMOVING SCALE FROM METAL RODS.
APPLICATION FILED FEB. 12, 1903.
NO MODEL. 4 SHEETS—SHEET 4.

Witnesses.
E. B. Gilchrist
D. T. Davies

Inventor
Ernst Boley
by J. B. Fay
Attorney

No. 777,178.
Patented December 13, 1904.

UNITED STATES PATENT OFFICE.

ERNST BOLEY, OF CLEVELAND, OHIO, ASSIGNOR TO AMERICAN STEEL & WIRE COMPANY OF NEW JERSEY, OF CHICAGO, ILLINOIS, A CORPORATION OF NEW JERSEY.

APPARATUS FOR REMOVING SCALE FROM METAL RODS.

SPECIFICATION forming part of Letters Patent No. 777,178, dated December 13, 1904.

Application filed February 12, 1903. Serial No. 143,071. (No model.)

*To all whom it may concern:*

Be it known that I, ERNST BOLEY, a citizen of the United States, and a resident of Cleveland, county of Cuyahoga, and State of Ohio, have invented a new and useful Improvement in Apparatus for Removing Scale from Metal Rods, of which the following is a specification, the principle of the invention being herein explained and the best mode in which I have contemplated applying that principle, so as to distinguish it from other inventions.

My invention relates to means for removing scale from metal rods or analogous articles, and is particularly adapted for use in removing such scale from wire.

Said invention has for its object the removal of such scale in an efficacious and economical manner; and it consists of means hereinafter fully described, and particularly set forth in the claims.

The annexed drawings and the following description set forth in detail certain mechanism embodying the invention, such disclosed means constituting but one of the various mechanical forms in which the principle of the invention may be used.

Figure 1:
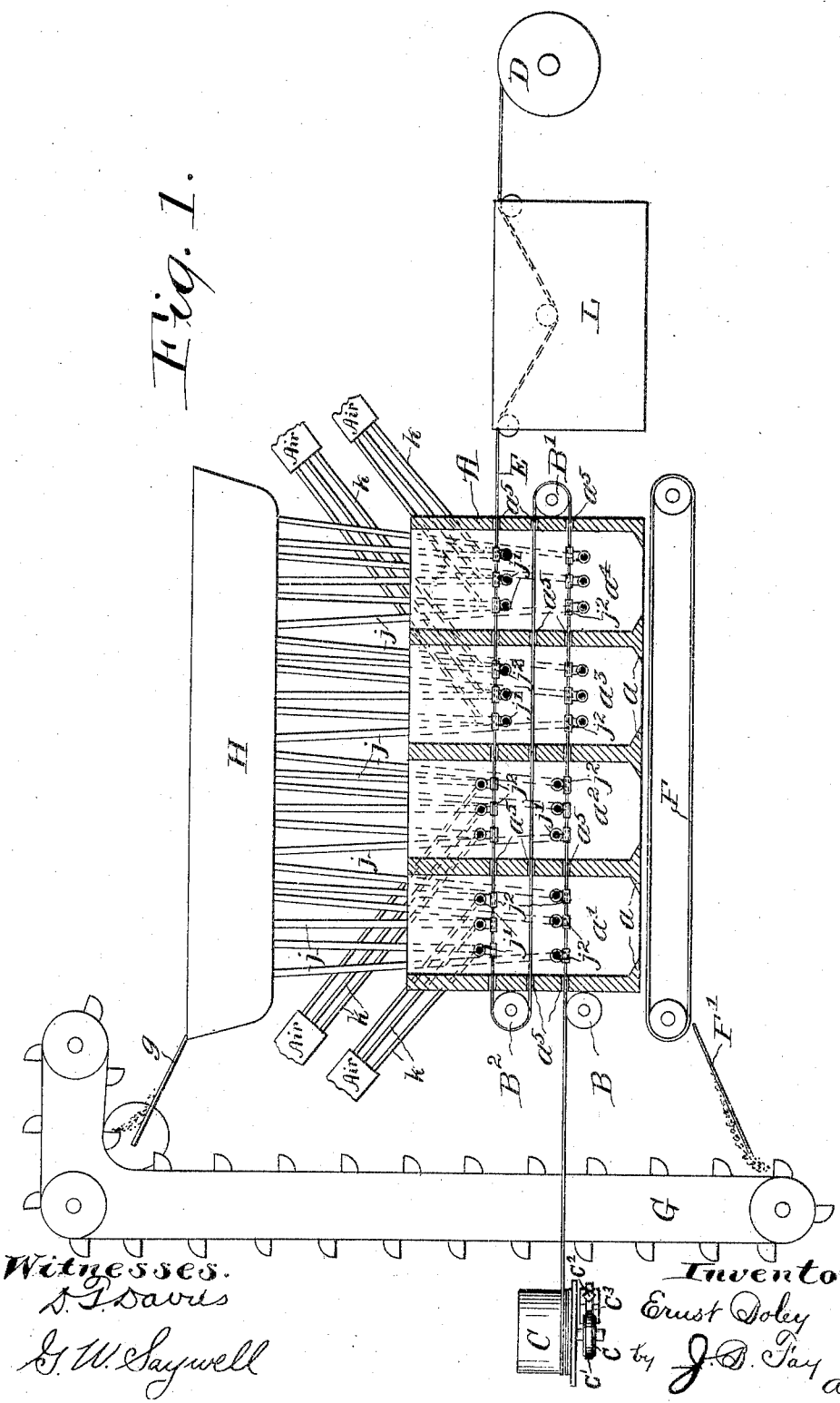
Figure 2:
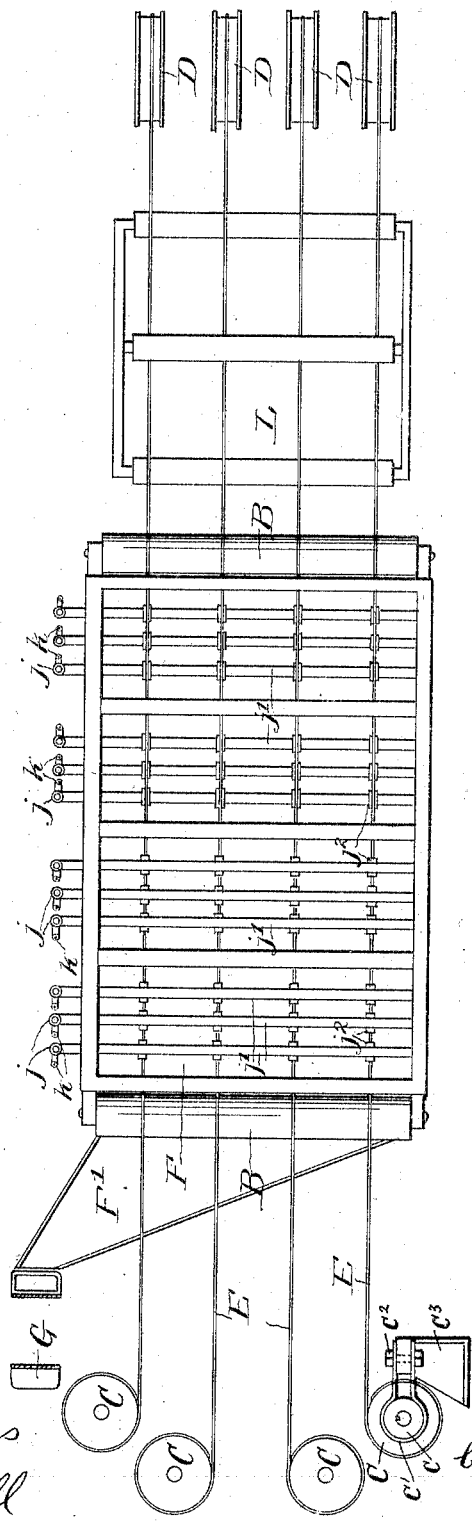
Figure 3:
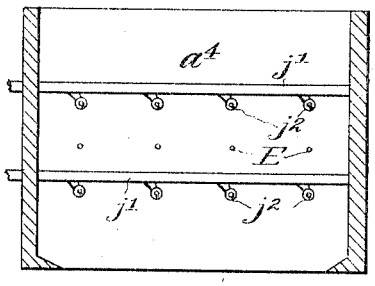
Figure 4:
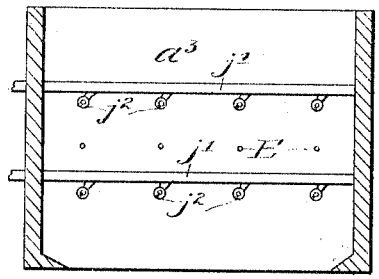
Figure 5:
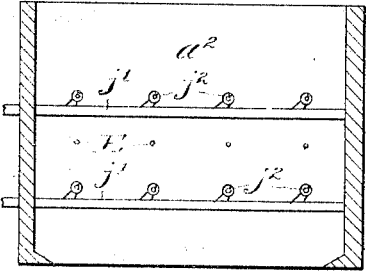
Figure 6:
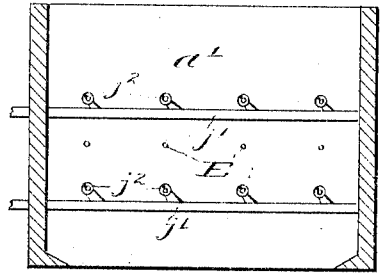
Figure 7:
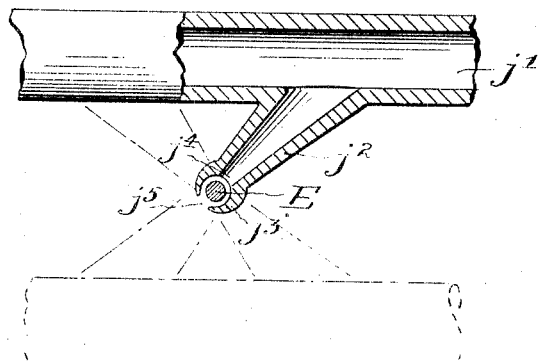
Figure 8:
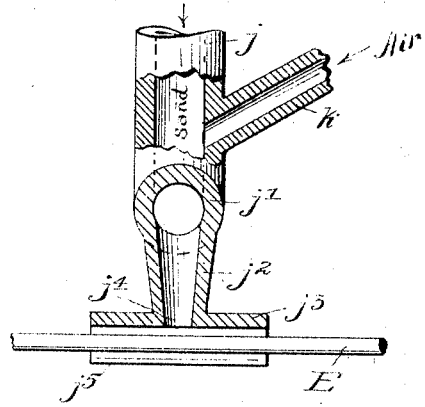
Figure 9:
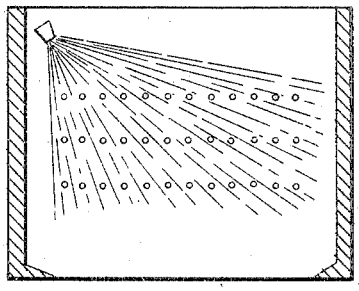
Figure 10:
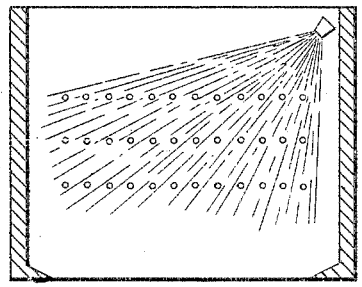
Figure 11:
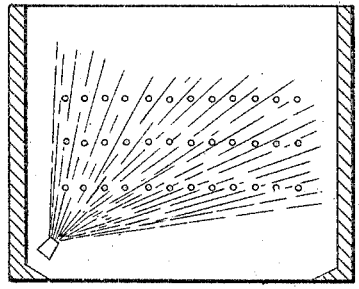
Figure 12:
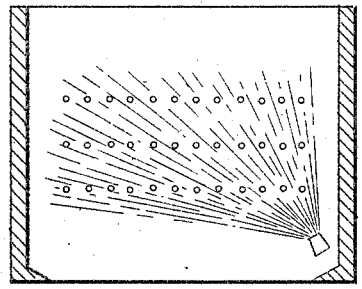

In said annexed drawings, Figure 1 represents a diagrammatic side elevation of an apparatus embodying my invention, a portion thereof being shown in vertical section and a portion being broken away. Fig. 2 represents diagrammatically a plan of such apparatus, a portion being in horizontal section. Figs. 3, 4, 5, and 6 represent detail transverse vertical sectional views of four chambers, respectively, which constitute a part of my said invention. Figs. 7 and 8 represent enlarged detail views, partly in section, on axial planes of a sand-blast nozzle used in said apparatus, the angle of projection for the comminuted material in the chambers represented by Figs. 3, 5, and 6 being shown in dotted lines in Fig. 7. Figs. 9, 10, 11, and 12 represent sections similar to those of Figs. 3, 4, 5, and 6 of a modified form of device.

A casing A is divided into four compartments $a'$, $a^2$, $a^3$, and $a^4$, respectively, each compartment being open at its top and bottom and provided with downwardly-inclined ledges $a$ projecting from the lower edges thereof, as shown in Figs. 1, 3, 4, 5, and 6. Upon the outside of the ends of the casing are mounted in suitable bearings secured thereto three rollers B, B', and $B^2$, two of such rollers being mounted upon one end and the third being mounted upon the other end, as shown in Fig. 1. Opposite these two ends of the casing are mounted two reels, a feeding-reel C and a take-up reel D, reel C being horizontally mounted and adapted to receive a coil of wire E. Reel D is adapted to take up and coil the wire as it receives it and is positively driven by any suitable means, (not shown,) as will be readily understood. There are as many reels C and D as there are strands of wire to be operated upon. As illustrated, the apparatus is designed to operate upon four strands simultaneously. In alinement with the peripheries of rollers B, B', and $B^2$ and in the casing and partitions thereof are apertures $a^5$ $a^5$, &c., these apertures permitting a strand of wire to pass over the rollers through the compartments $a'$, $a^2$, $a^3$, and $a^4$, such passage being effected a number of times—three, as illustrated. The diameters of these rollers are made such as to negative any deleterious effect on the wire by reason of too sharp bending as the wire passes around same. Below the casing is a belt conveyer F, passing beneath each compartment and a short distance beyond the casing, as shown in Fig. 1. This conveyer is somewhat wider than the compartments and is adapted to receive material discharged from the compartments and convey it longitudinally therefrom. At the discharging end of the conveyer is placed a chute F', which discharges into a vertical conveyer G, which latter discharges into a chute $g$. Said chute discharges into a large hopper H, located above the casing A, as shown, Fig. 1. From the bottom of this hopper extends a number of pipes $j$, which connect with the ends of a number of pipes $j'$, extending transversely through the compartments $a'$, $a^2$, $a^3$, and $a^4$. I have illustrated the apparatus as being provided with six pipes $j''$ for each compartment—three in an upper horizontal plane and three in a lower. The lower end of each pipe *j* is connected with a pipe *k*, which is connected with a suitable source (not shown) of air under pressure. Each pipe *j''* is provided with a number of nozzles *j²*, projecting radially therefrom, as shown in Fig. 7. Each nozzle is formed with an annular guiding portion *j³* adjacent to the opening *j⁴*, extending horizontally and provided at its lower side with a slot *j⁵*. These nozzles are equal in number to the number of strands of wire passing through the compartments, and each guiding portion is adapted to receive and permit a strand of wire to pass therethrough, as shown in said figure. The nozzles *j²*, located in the different compartments, are set at different angles with reference to the pipes *j''*, as shown in Figs. 3, 4, 5, and 6. Those in compartment *a'* are set at an angle of substantially one hundred and thirty-five degrees, those in compartment *a²* at substantially an angle of forty-five degrees, those in compartment *a³* at substantially an angle of two hundred and twenty-five degrees, and those in compartment *a⁴* at substantially an angle of three hundred and fifteen degrees—that is, at angles of ninety degrees from each other. These nozzles, which lie at different angles with reference to the pipes *j''*, are preferably in the same plane, which latter makes an angle with the vertical plane passing through the rod.

In operating the above-described apparatus hopper H is provided with a hard comminuted material, such as quartz sand, which passing down pipes *j* is blown through pipes *j''* by the air coming from pipes *k*. This sand then passes out of nozzles *j²*, whence it escapes through the guiding-pieces *j³*. The wire is meanwhile passed through these nozzles under tension. Such tension may be produced in any suitable manner—such as, for instance, providing reel C with a suitable brake, comprising a pulley *c*, a brake-band *c'*, surrounding the same, a bolt *c²* for tightening such band, and a standard *c³*. Sand issuing from the opening *j⁴* of each nozzle strikes the adjacent surface of the wire and removes scale therefrom. The angles of the nozzles being varied, as above described, it will be seen that all parts of the surface of the wire will before leaving the casing after one passage through all the compartments be subjected to the action of sand issuing directly from the nozzles. The wire first passes through the compartments in a lower horizontal plane, and hence the zone of most efficient action of the lower set of nozzles. On leaving the compartment *a⁴* it passes around roller B' and is bent. Scale not removed is loosened by such bending, and the wire then passes through the zone of action of the sand coming from part of the upper and lower series of nozzles, where it is again subjected to the impinging action of sand. It will be noted that the inclined position of the nozzles brings the rod upon this second passage into a different position relatively to the lower nozzles than it was during its first passage through the compartments, or, in other words, as regards any one nozzle in the lower set, the rod has assumed a higher position after passing around the horizontally-mounted roller, and inasmuch as the nozzle has not changed its position the material is projected upon the rod with its maximum force at a different point on the rod than that upon which it was projected when the rod was making its first passage. As has been stated, the rod will be subjected during this second passage to material projected from a part of the lower set and a part of the upper set of nozzles. Of course what has been said as regards the change of relative positions of the rod and some of the nozzles during the first and second passages through the compartments applies equally to the rod and to those nozzles that act upon it during the second and third passages. The wire then passes around roller B², is again bent, remaining scale being so loosened, and then passes through the upper set of nozzles, where all its surface is again subjected to the zone of action of the sand of greatest efficiency. In emerging from compartment *a⁴* all the scale will have been removed. I have found that by subjecting the wire to a tension while being acted upon as above described the process is more efficient than when such tension is not imparted thereto. After leaving compartment *a⁴* the wire is passed through yeast, meal, or other suitable material in a receptacle L for giving the wire its required coating, as is the present practice. The sand and removed scale fall down upon the belt conveyer F, are carried to conveyer G, and discharged into hopper H, whence it is taken through pipes *j* to be again used.

Instead of employing a multiplicity of nozzles arranged as described and shown in Figs. 3, 4, 5, and 6 but a single nozzle may be used in each chamber, as shown in Figs. 9, 10, 11, and 12. In such case I place the nozzle at varying angles, respectively, in each chamber. These preferably, as before described, vary ninety degrees from each other, so that each portion of the surface of the wire is exposed. In this form of apparatus a much larger number of wires may be acted upon simultaneously, as will be readily understood.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In apparatus for removing scale from metal rods and analogous articles, the combination of means for projecting comminuted material, a series of rollers mounted in planes transverse to the plane in which such material is projected, and means for drawing such rods under tension over said rollers and repeatedly through the zone of action of said projected material.

2. In apparatus for removing scale from metal rods and analogous articles, a nozzle for projecting comminuted material provided with a guiding portion and slot for said rod adjacent to its discharge-opening.

Signed by me this 29th day of January, 1903.

ERNST BOLEY.

Attest:
D. T. DAVIES,
A. E. MERKEL.